US007136459B2

(12) United States Patent
Cooper et al.

(10) Patent No.: US 7,136,459 B2
(45) Date of Patent: Nov. 14, 2006

(54) METHODS AND APPARATUS FOR DATA CACHING TO IMPROVE NAME RECOGNITION IN LARGE NAMESPACES

(75) Inventors: Robert S. Cooper, Columbia, SC (US); Derek Sanders, Columbia, SC (US); Vladimir Sergeyevich Tokarev, Columbia, SC (US)

(73) Assignee: Avaya Technology Corp., Basking Ridge, NJ (US)

( * ) Notice: Subject to any disclaimer, the term of this patent is extended or adjusted under 35 U.S.C. 154(b) by 139 days.

(21) Appl. No.: 10/772,885

(22) Filed: Feb. 5, 2004

(65) Prior Publication Data
US 2005/0175159 A1 Aug. 11, 2005

(51) Int. Cl.
*H04M 1/64* (2006.01)
(52) U.S. Cl. ............................ 379/88.03; 455/414.1; 455/563; 704/234; 704/246; 704/270
(58) Field of Classification Search ............. 379/88.03
See application file for complete search history.

(56) References Cited

U.S. PATENT DOCUMENTS

| 5,917,891 A * | 6/1999 | Will ..................... 379/88.03 |
| 6,049,594 A * | 4/2000 | Furman et al. ............ 379/67.1 |
| 6,154,526 A | 11/2000 | Dahlke et al. |
| 6,529,585 B1 * | 3/2003 | Ng et al. ................. 379/88.03 |
| 6,823,307 B1 * | 11/2004 | Steinbiss et al. ............ 704/252 |
| 2002/0196911 A1 | 12/2002 | Gao et al. |
| 2003/0149566 A1 * | 8/2003 | Levin et al. ................ 704/256 |
| 2005/0033582 A1 * | 2/2005 | Gadd et al. ................. 704/277 |
| 2005/0152511 A1 * | 7/2005 | Stubley .................... 379/88.01 |

FOREIGN PATENT DOCUMENTS

| WO | WO 98/16048 | 4/1998 |
| WO | WO 99/65215 | 12/1999 |

OTHER PUBLICATIONS

European Search Report, European Application No. EP 05 25 0570, dated May 3, 2005.

* cited by examiner

*Primary Examiner*—Gerald Gauthier

(57) ABSTRACT

Systems and techniques for improved efficiency and accuracy in voice dialing and directory lookup applications. A voice dialing module receives an input from a user and examines a directory to identify recognition results matching the voice input. A list of recognition results matching the voice input is constructed, the entries being ranked by confidence. A called party cache for each user includes entries for parties the user is likely to call. Once the result list has been constructed, the voice dialing module compares the list with the called party cache in order to determine if entries in the list appear in the cache. If an entry in the result list appears in the cache, the result list is reordered in order to take into account the increased likelihood that an entry appearing in the called party cache will be an entry the user wishes to call.

19 Claims, 4 Drawing Sheets

FIG. 2A

| RESULT NO. | RECOGNITION RESULT | CONFIDENCE SCORE |
|---|---|---|
| 1 | JAKE SMITH | 60 |
| 2 | JANE SMITH | 58 |
| 3 | JOANNE SMITH | 50 |
| 4 | RON SMITH | 45 |
| 5 | JOHN SMITH | 44 |
| 6 | JOHN SMITHERS | 44 |
| 7 | JOHN SLATHERS | 40 |
| 8 | JANE SANDERS | 30 |
| 9 | ROB KANKER | 15 |

| POSITION | RECOGNITION RESULT | PHONE | LOCATION | DATA |
|---|---|---|---|---|
| 1 | BOB COOPER | | COLUMBIA, SC | |
| 2 | DEREK SANDERS | | COLUMBIA, SC | |
| 3 | VLAD TOKAREV | | COLUMBIA, SC | |
| 4 | JOHN SMITH | | LEXINGTON, KY | |
| 5 | JASON HUCKS | | COLUMBIA, SC | |
| 6 | RICHARD ULMER | | MILPITAS, CA | |
| 7 | KATIE HOWE | | MILPITAS, CA | |
| ... | | | | |
| N | WILL JEFFORDS | | COLUMBIA, SC | |

| RESULT NO. | RECOGNITION RESULT | CONFIDENCE SCORE | |
|---|---|---|---|
| 1 | JOHN SMITH | 30 | 208E |
| 2 | JAKE SMITH | 60 | 208A |
| 3 | JANE SMITH | 58 | 208B |
| 4 | JOANNE SMITH | 50 | 208C |
| 5 | RON SMITH | 45 | 208D |
| 6 | JOHN SMITHERS | 44 | 208F |
| 7 | JOHN SLATHERS | 40 | 208G |
| 8 | JANE SANDERS | 30 | 208H |
| 9 | ROB KANKER | 15 | 208I |

118

| POSITION | RECOGNITION RESULT | PHONE | LOCATION | DATA | |
|---|---|---|---|---|---|
| 1 | BOB COOPER | | COLUMBIA, SC | | 210A |
| 2 | DEREK SANDERS | | COLUMBIA, SC | | 210B |
| 3 | VLAD TOKAREV | | COLUMBIA, SC | | 210C |
| 4 | JOHN SMITH | | LEXINGTON, KY | | 210D |
| 5 | JASON HUCKS | | COLUMBIA, SC | | 210E |
| 6 | RICHARD ULMER | | MILPITAS, CA | | 210F |
| 7 | KATIE HOWE | | MILPITAS, CA | | 210G |
| ... | | | | | |
| N | WILL JEFFORDS | | COLUMBIA, SC | | 210N |

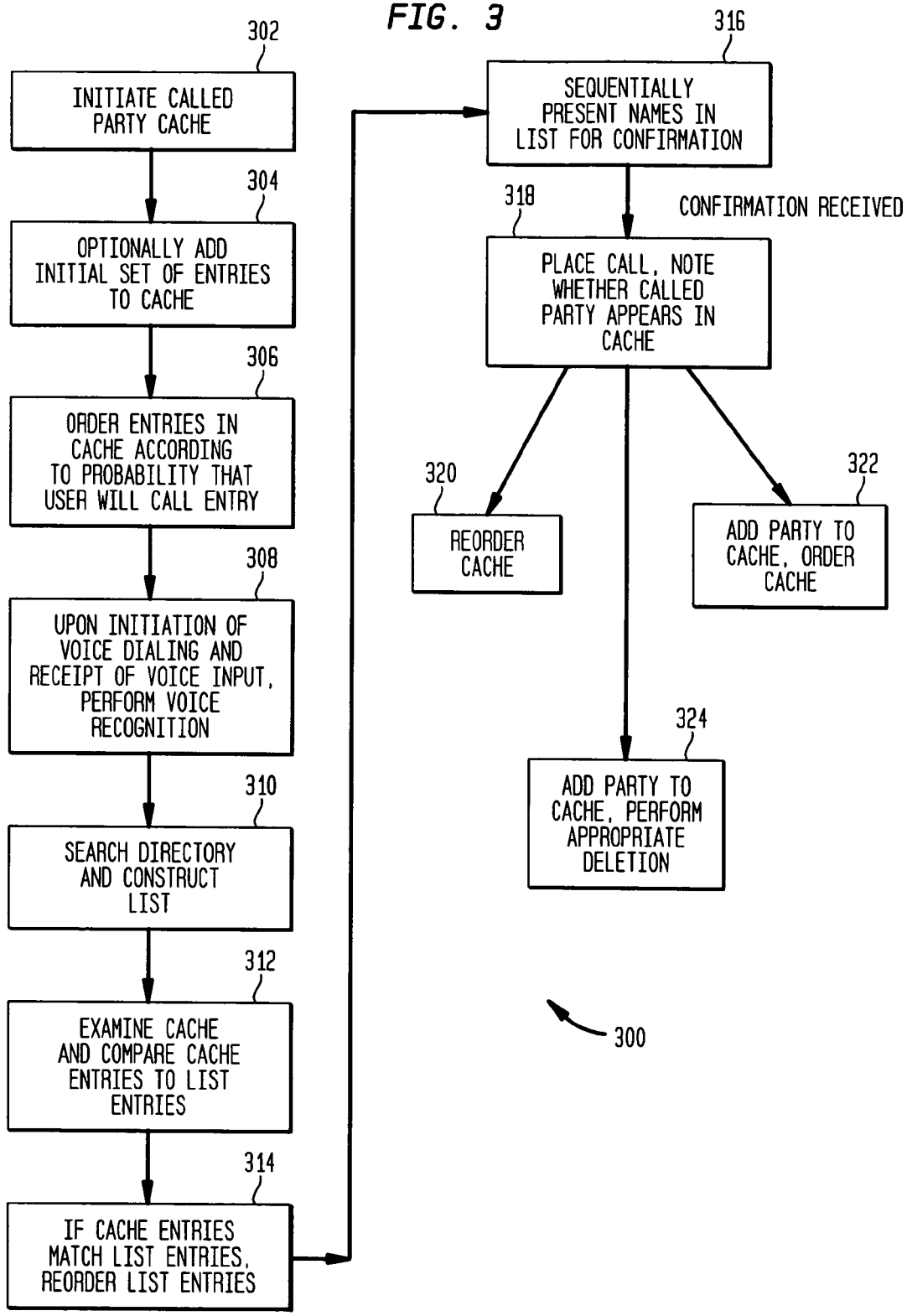

METHODS AND APPARATUS FOR DATA CACHING TO IMPROVE NAME RECOGNITION IN LARGE NAMESPACES

FIELD OF THE INVENTION

The present invention relates generally to improvements in automated voice response systems. More particularly, the invention relates to advantageous systems and techniques for caching of names and other information that is expected to be more frequently accessed by a user, in order to improve recognition in various applications, such as voice dialing.

BACKGROUND OF THE INVENTION

One common use of speech recognition is in voice dialing. A user is prompted to speak a name, a voice recognition system interprets the user's voice input and an attempt is made to match the identified name to a directory entry. Voice dialing systems typically perform reasonably well when the namespace, that is, the number of names among which a selection is to be made is reasonably small, for example, 1,000 or less. However, for large name spaces, such as might be encountered in a telephone directory of a very large company, voice dialing systems encounter serious problems. A voice recognition system typically operates by receiving a voice input from a user and producing a match list, comprising an ordered list of possible matches to the voice input, with each possible match being associated with a confidence score. In a large organization, many employees may be expected to have had identical names or similar sounding names so that many false matches are likely to occur. A voice recognition system may present the candidates to user with identifying information allowing the user to confirm or reject the entries in the result list. Alternatively, the system may attempt to narrow the search base by presenting preliminary questions to the user before attempting a match. With the present state of voice recognition technology, either of these approaches is likely to be extremely time consuming and annoying for the user as the user either rejects the succession of false matches or else answers numerous questions to narrow the search space.

Users of voice recognition systems, especially those that search very large namespaces, do not have an equal likelihood of calling every party associated with an entry in the namespace. A typical caller to an organization will not interact frequently with more than a relatively small selection of people in the organization, and will usually limit his or her calls to those people. A voice recognition result matching the name of a party with whom the user frequently interacts will have a higher likelihood of correctly identifying the party the user wishes to call than will a result that does not match the name of a party with whom the user is known to frequently interact.

There exists, therefore, a need for systems and techniques that take into account the fact that a user has a higher probability of calling members of a relatively small group of contacts, that identifies contacts the user is more likely to call and that uses knowledge of the contacts that a user is more likely to call in evaluating recognition results.

SUMMARY OF THE INVENTION

A system according to an aspect of the present invention includes a voice dialing module that receives a voice input from a user and examines a directory in order to identify entries matching the voice input. The voice dialing module constructs a list of recognition results that are candidates for matches to the voice input, with the entries being ranked by confidence. The system also includes a called party cache for each user, with the called party cache including entries for parties the user is likely to call. Once the list of matching directory entries has been constructed, the voice dialing module compares the list with the called party cache in order to determine if entries in the list appear in the called party cache. If an entry in the result list appears in the called party cache, the result list is reordered in order to take into account the increased likelihood that an entry appearing in the called party cache will be an entry the user wishes to call. The use of a cache similar to that discussed herein is addressed in "Recognition Results Postprocessor for Use in Voice Recognition Systems," U.S. patent Ser. No. 10/772,448, assigned to a common assignee with the present invention and filed on even date herewith, and incorporated herein by reference in its entirety.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates documents used and constructed by voice dialing system according to an aspect of the present invention; and FIG. 3 illustrates a process of voice dialing according to an aspect of the present invention.

DETAILED DESCRIPTION

Figure 1:
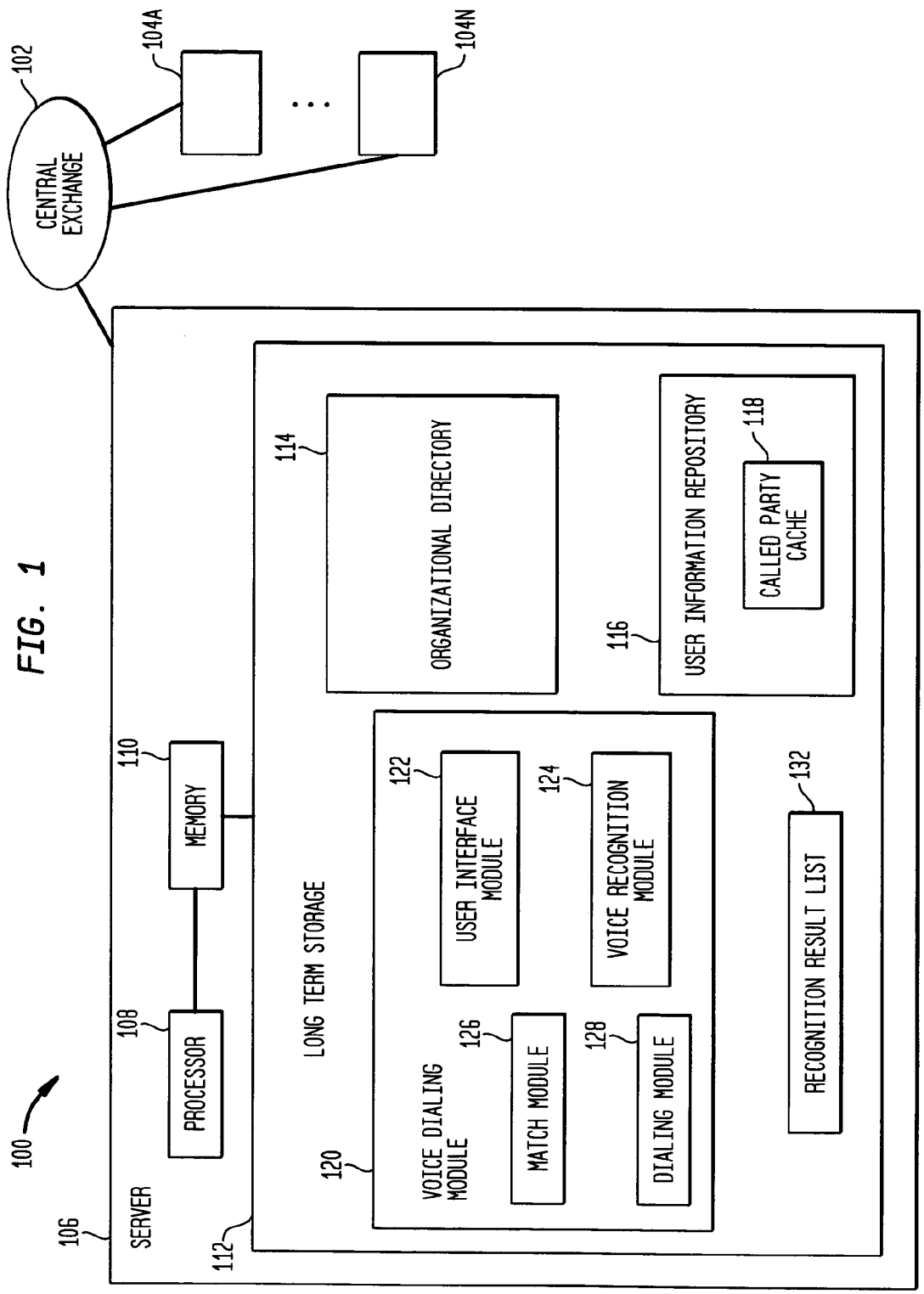
FIG. 1 illustrates a voice dialing system according to an aspect of the present invention.

FIG. 1 illustrates a system 100 for providing voice dialing services for an organization. The system 100 includes a central exchange 102 connected to a plurality of telephone sets 104A . . . 104N. The system 100 further includes a server 106, comprising a processor 108, memory 110 and long term storage 112. The server 106 hosts or otherwise has access to an organizational directory 114, preferably implemented as a database stored in the long term storage 112. The organizational directory includes name information and telephone number information for members of the organization, and may suitably include other information useful for identifying a particular person. In the present example, each entry in the directory 114 includes an individual's name, telephone number, location, job title, and the entire hierarchy of departments to which the individual belongs, such as information services, data processing, network maintenance. Such information helps to distinguish a particular individual from others, particularly if the caller has only partial information or where multiple individuals have the same or closely similar names.

The server 106 also hosts a user information repository 116, including a called party cache, for each user. For purposes of illustration, a single called party cache 118 is shown here, for a user "Bob" assigned to the telephone set 104A. It will be recognized, however, that many called party caches such as the cache 118 will be employed by a system such as the system 100. The called party cache 118 can accommodate a number of entries. Each entry suitably includes the name and telephone number of a party the user is likely to call. The cache 118 may include multiple entries for the same party, to take into account the fact that the user may call a party more frequently at one location than at another. For example, the user may call a party's mobile telephone more frequently than his or her office telephone, or vice versa.

Each entry may suitably be associated with an indication of the probability that the user will call the party associated with the entry, that is, that the user will call the telephone number stored as part of the entry. Probability determinations may be made, for example, by examining the user's call history or by using knowledge of the user as a caller. For example, if the user is employed in the engineering department, he or she may be considered more likely to call other engineers, while if the user is employed in the sales department, he or she may be considered more likely to call customers and potential customers. The indication of probability may be accomplished, for example, by ordering the entries in the cache according to how recently the contact associated with each entry was called by the user. It will be recognized that alternative ways of ordering entries may be chosen and that. Moreover, alternative ways exist of indicating relative ranking of cache entries, for example associating each entry with a numerical probability score.

The server 106 hosts a voice dialing module 120, comprising a user interface module 122, a voice recognition module 124, a match module 126 and a dialing module 128. The user interface module 122 presents prompts to the user and receives and manages the user's inputs. The voice recognition module 124 receives voice inputs and grammars from the user interface module 122 and converts the inputs to text. The voice recognition module 124 passes this text, suitably comprising names, as well as a confidence score assigned to each name by the voice recognition module 124, back to the user interface module 122. The user interface module 122 then passes the match list to the match module 126 if they represent data entries, such as the name of a party to be called.

Suppose that the user Bob places a voice dial call to John Smith. The user initiates contact with the system 100, invokes the voice dialing module 120 and speaks the name "John Smith" when prompted. Upon receiving a user input, the match module 126 searches for an entry matching the name "John Smith". Suitably, the match module 126 may search the directory 114, as well as the called party cache 118, in order to construct and order a match list 132. A match list is a list of some predetermined number n of entries representing possible matches, with the n entries being the n directory entries for which the highest confidence of a match exists. The confidence of a match may suitably be expressed in terms of a confidence score derived through known voice recognition techniques for estimating the likelihood that a particular string of text was correctly derived from a user's utterance.

The entries in the list 132 are suitably ranked in order of their confidence scores. Suitably, the directory 114 is searched and the list 132 is constructed. Next, the user's called party cache 118 is searched. The list 132 is then reordered, with entries that are found in the cache 118 being given increased priority in the list 132. Numerous different alternatives exist for increasing the priority of entries that are found in the cache. For example, entries found in the cache 118 may be moved to the top of the list 132, in the same order in which they are found in the cache. As, an alternative, entries found in the cache may be moved to the top of the list 132, with their relative rankings being assigned according to their confidence scores. As a further alternative, entries that are found in the cache may have an increment added to their confidence score. It will be recognized that numerous further alternative techniques may be envisioned. It will be noted that every entry in the called party cache 118 will also appear in the directory 114, because the information stored in the cache 118 will be a subset of the information stored in the directory 114.

Any number of strategies may be employed for adding initial entries to a cache such as the cache 118. If desired, whenever a user is added to the system 100, a set of entries that the user is likely to call may be added. These may be taken, for example, from a personal contact list, the directory entries for co-workers in the same department or location, the names of customers and the like. In addition, or as an alternative to this strategy for adding entries, an entry may suitably be added to the cache each time a valid recognition occurs using the voice dialing module 120. As a supplement to this strategy, an entry may also be added to the cache whenever a user dials the entry by conventional means.

Preferably, the cache 118 is updated whenever a voice dialing operation is performed. If a correct recognition occurs, and the recognized entry is present in the cache, the probability score for the entry is updated. If the recognized entry is not present in the cache and the cache is not full, the recognized entry is added to the cache. If the recognized entry is not present in the cache and the cache is full, the recognized entry is added to the cache and the existing entry having the lowest ranking, such as the oldest entry or the entry otherwise designated as having the lowest associated probability, is removed.

Updating of the cache 118 may also take into account the success of recognition with particular directory entries. If directory entries exist such that the user's inputs relating to those entries are correctly interpreted with a high degree of reliability, it may not be necessary to store corresponding entries in the cache. For example, if the user's input of the name "Fred Johnson" always returns a result list where "Fred Johnson" has the highest confidence score, there may be no need to consider the contents of the cache 118 in examining the list. Thus, if the history of the user's performance indicates such a high degree of reliability associated with the user's utterance of the name "Fred Johnson," it may be possible to remove that entry from the cache 118.

FIG. 2A illustrates additional details of the list 132 and the called party cache 118, after the list 132 has been constructed but before the list 132 has been reordered as a result of examining the cache 118. At this point, the list 132 includes nine entries 208A–208I. These entries are for the parties Jake Smith, Jane Smith, Joanne Smith, Ron Smith, John Smith, John Slathers, Jane Sanders and Rob Kanker. The entries are ranked in order of their confidence scores. Suitably, each entry in the list 132 optionally includes details present in the corresponding entry in the directory 114, including the name, telephone number, location and position of the called party. This information helps in identifying the correct party, constructing clarifying prompts for the user and completing the call. The cache 118 includes n entries 210A . . . 210N, of which the entries 210A–210G and the entry 210N are illustrated in detail here. Each entry in the cache 118 also suitably includes details found in the corresponding entry in the directory 114, or includes sufficient details that the corresponding entry in the directory 114 can be located, as well as a probability score indicating its relative likelihood of being called by the user associated with the cache 118. The entries in the cache 118 may suitably be ranked in order of their probability scores.

It will be seen that the fourth entry in the cache 118 corresponds to the fifth entry in the list 132. Recognition of a match between the entries results in a reordering of the list 132. Any number of different strategies can be employed to reorder the list 132. For example, any entries appearing in the cache may simply be moved to the top of the list 132. If multiple entries in the list appear in the cache, they can be placed in a group at the top of the list 132, with ordering within the group either depending on either the confidence score they were assigned when the result list was constructed, or the likelihood score of the corresponding cache entries. Another possible technique is to add a fixed confidence score to those entries in the list 132 that also appear in the cache and reorder the list 132 based on the resulting confidence scores.

FIG. 2B illustrates the list 132, with reordering having been performed as a result of the match between the entry 208E of the list 132 and the entry 210D of the cache 118. It will be seen that the entry 210E has now been moved to the top of the list 132, and the entries previously above it have been moved down. Here, the entry 210E has simply been forced to the top of the list 132 without any change in its confidence score. Alternatively, a sufficient increment could have been added to the confidence score of the entry 210E to move it to the top, with the entries 210A–210I then being reordered. In the present example, an increment bringing the score associated with the entry 210E over 60 would be sufficient to elevate that entry to the top of the list 132. As a further alternative, if the reordering strategy were simply to assign a confidence increment to entries in the list 132 that matched entries in the cache 118, an increment could have been added to the confidence score associated with the entry 210E that was not necessarily sufficient to bring that entry to the top of the list 132. For example, the strategy might be to assign an increment of 20 to list entries that corresponded to cache entries.

FIG. 3 illustrates a process 300 of improved voice recognition and voice dialing according to an aspect of the present invention. The process 300 may suitably be accomplished using a system similar to the system 100 of FIG. 1. The process 300 is described here in terms of a single user, but it will be recognized that the process may be repeated or expanded to accommodate a large number of users. At step 302, a called party cache for a user of a telephone system including voice dialing features is initiated. The called party cache includes space for a number of entries including information associated with a party the user is likely to call. Each entry may suitably include the name and telephone number of the party, location and department information associated with the party, and any other information useful for identifying the party and matching the entry to a corresponding telephone directory entry. At optional step 304, an initial set of entries is added to the cache. These entries may suitably be taken from any source considered likely to indicate the parties the user is likely to call. Examples of such sources include a contact list, a list of co-workers in the same department or location, a customer list, a list of dialed calls the user has historically made, or the like. At step 306, the entries in the cache are ordered according to an estimate of the probability of the user's calling the party associated with each entry. At step 308, upon initiation of a voice activated dialing process and receipt of voice input by the user of the name of the party to be called, voice recognition is performed on the input. At step 310, a directory is searched and a list is constructed of names in the directory representing possible matches to the input. Each name is associated with a confidence score indicating the estimated likelihood that the name matches the user's voice input, and the list comprises a predetermined number of names having the greatest confidence scores. The list is ordered according to confidence score.

At step 312, the cache is examined and each entry in the cache is compared to the entries in the list. If one or more entries in the cache matches an entry in the list, the process proceeds to step 314 and the list is reordered to take advantage of the information provided by the match, typically by giving the matching list entries a higher position than it would otherwise have. If more than one entry in the cache matches an entry in the list, ordering among the matching list entries is performed according to some predetermined strategy, for example, placing the matching list entries in the same relative order as the corresponding cache entries.

At step 316, the names in the list are sequentially presented to the user for confirmation that the party is the party the user intended to call. If none of the names are confirmed, the user may be asked to repeat the voice input or other procedures may be used to determine the correct party. If a name is confirmed, the process proceeds to step 318, the call is placed and a notation is made as to whether or not the name of the party appears in the cache. If the name of the party appears in the cache, the process proceeds to step 320 and the ordering of the cache is updated. For example, the entry for the party may move to a higher position in the cache relative to other entries. If the name of the party does not appear in the cache and the cache is not full, the process proceeds to step 322, the name of the party is added to the cache and the cache is appropriately ordered to take into account the calling probability for the party. If the name of the party does not appear in the cache and the cache is not full, the process proceeds to step 324 and appropriate additions, deletions and ordering are performed. Typically, the name of the called party is inserted in the cache, the name with the lowest calling probability is removed and the entries are ordered in light of their estimated calling probability.

While the present invention is disclosed in the context of a presently preferred embodiment, it will be recognized that a wide variety of implementations may be employed by persons of ordinary skill in the art consistent with the above discussion and the claims which follow below.

We claim:

1. A voice dialing system comprising:
   a directory including entries for telephone numbers that may be called by a user;
   a called party cache including entries a user is considered likely to call; and
   a voice dialing module for receiving a voice input from a user, employing voice recognition to analyze the voice input, examining the directory to identify candidates for matched entries from the directory matching the voice input, constructing a list of recognition results that are candidates for matches to the voice input with the entries on the list ranked by confidence, and comparing the list of recognition results with the called party cache to determine if entries in the list appear in the called party cache, the voice dialing module assigning an increased likelihood of matching to a list entry appearing in the called party cache; and reordering said list based on said comparing results.

2. The system of claim 1, wherein entries within the called party cache are associated with indicia indicating a probability that a contact represented by an entry will be called by the user.

3. The system of claim 2, wherein the directory may include multiple entries for a party, each entry identifying a contact location at which the party may be called.

4. The system of claim 3, wherein one or more entries associated with a party may appear in the cache, the appearance and relative position in the cache of an entry associated with a party indicating a probability that the user will call the party at the location indicated by the entry.

5. The system of claim 4, wherein the call probabilities for entries within the called party cache are based on a past history of calls by the user.

6. The system of claim 4, wherein the call probabilities for entries within the called party cache are based on knowledge of the user as a caller.

7. The system of claim 6, wherein the knowledge of the user as a caller includes knowledge of an organization in which the user is employed.

8. The system of claim 4, wherein the voice dialing module is operative to reorder the list if one or more entries in the list appears in the called party cache.

9. The system of claim 8, wherein the voice dialing module reorders the list by moving entries in the list that also appear in the cache to a higher position in the list.

10. The system of claim 9, wherein the voice dialing module reorders the list by adding an increment to the confidence score of all entries in the list that reappear in the cache and reordering the list on the basis of the changed confidence score.

11. The system of claim 10, wherein an initial set of entries to the called party cache for a user is made when a user is added as a possible user of the system.

12. The system of claim 11, wherein the called party cache is reordered when an entry in the called party cache is determined to match a voice input provided by a user in voice dialing, the reordering being performed so as to take into account the estimated probability that the entry will be called by the user in the future.

13. The system of claim 12, wherein an entry is added to the called party cache if a directory entry matches a voice input by the user and the entry does not appear in the called party cache.

14. The system of claim 10, wherein if the called party cache is full and an addition is to be made, an entry is deleted from the called party cache before making the addition, the deleted entry being the entry having the lowest estimated likelihood that it will be called by the user.

15. A method of voice dialing, comprising the steps of:
receiving a voice input from a user indicating a party the user wishes to call;
employing voice recognition to analyze the voice input;
utilizing a directory to construct a list of recognition results that are candidates for matches to the voice input ranked by confidence;
comparing the list of recognition results with a called party cache including entries the user is considered likely to call; and
assigning an increased likelihood of matching to a list entry appearing in the called party cache; and reordering said list based on said comparing results.

16. The method of claim 15, wherein the step of assigning includes reordering the list of recognition results if one or more entries in the list matches and entry in the called party cache.

17. The method of claim 16, further comprising the step of sequentially presenting the entries in the reordered list to the user for confirmation and dialing an entry upon receiving confirmation from the user.

18. The method of claim 17, wherein the step of sequentially presenting the entries to the user for confirmation is followed by a step of determining if the matching entry appears in the cache and adding the matching entry to the cache if it does not appear in the cache.

19. The method of claim 18, wherein the step of sequentially presenting the entries to the user for confirmation is followed by a step of reordering the cache if the matching entry appears in the cache.

* * * * *